United States Patent [19]

Hughes

[11] 4,021,933
[45] May 10, 1977

[54] STUDENT-PROGRAMMABLE EDUCATIONAL INSTRUMENTATION DEVICE

[75] Inventor: Leonard Hughes, Oakland, Calif.

[73] Assignee: Health Systems Management Corporation, Oakland, Calif.

[22] Filed: May 10, 1976

[21] Appl. No.: 684,540

[52] U.S. Cl. .................. 35/10; 35/17; 35/19 A; 35/19 R; 35/22 R
[51] Int. Cl.² ............................. G09B 23/00
[58] Field of Search ............. 35/8 R, 10, 13, 17, 35/22 R, 19 R, 19 A, 48 R; 73/1 F; 128/2 Z; 179/1 N

[56] References Cited
UNITED STATES PATENTS

| | | | |
|---|---|---|---|
| 3,310,883 | 3/1967 | Young | 35/10 |
| 3,392,241 | 7/1968 | Weiss et al. | 179/1 N |
| 3,524,198 | 8/1970 | Malmstadt et al. | 35/19 A |
| 3,698,385 | 10/1972 | Low et al. | 35/22 R |
| 3,798,794 | 3/1974 | Ravin | 35/17 |
| 3,805,414 | 4/1974 | Marsh | 35/19 A |
| 3,869,812 | 3/1975 | Arakelian et al. | 35/22 R |
| 3,939,687 | 2/1976 | Waldron | 73/1 F |

Primary Examiner—Richard C. Pinkham
Assistant Examiner—Vance Y. Hum
Attorney, Agent, or Firm—Owen, Wickersham & Erickson

[57] ABSTRACT

A student-programmable education instrumentation device is disclosed which includes a plurality of programmably selectable electronic circuits within a suitable housing. A control panel having plural controls and certain input jacks connected to some of the circuits, a visual display device and a program panel having plural plug-in receptacles are mounted on the housing. The programmably selectable circuits include a null-point circuit for comparing a reference signal to an unknown input signal at one of the jacks or receptacles; a plurality of calibrated variable amplifiers and generator circuits, and a power supply. A variety of input sensors, probes and devices are provided for connection to the device at the jacks or receptacles. Via programming interconnection by the student the device is transformed into a preselected one of a virtually unlimited number of instruments aiding learning and understanding of physical and chemical phenomena and the application and operation of electronic instrumentation thereto.

20 Claims, 24 Drawing Figures

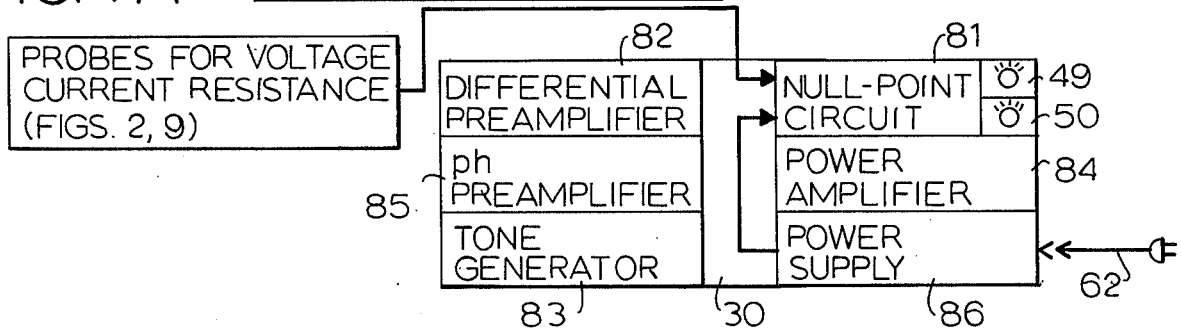
FIG. 4-A   ELECTRICAL MULTIMETER
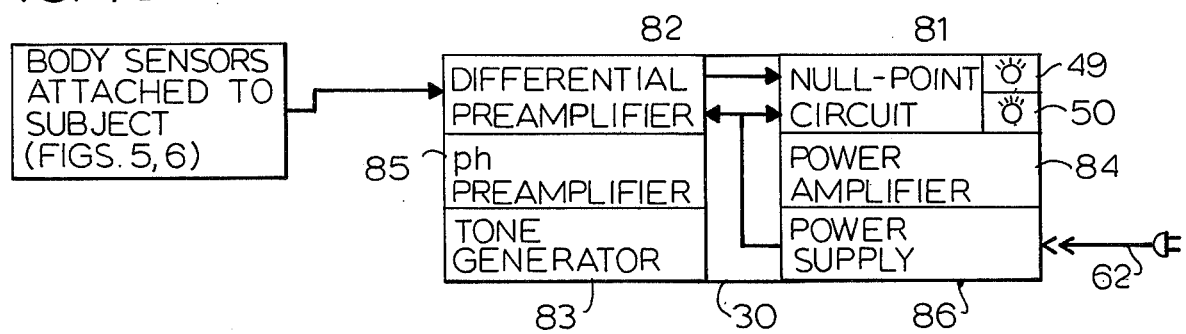
FIG. 4-B   BIOMEDICAL INDICATOR
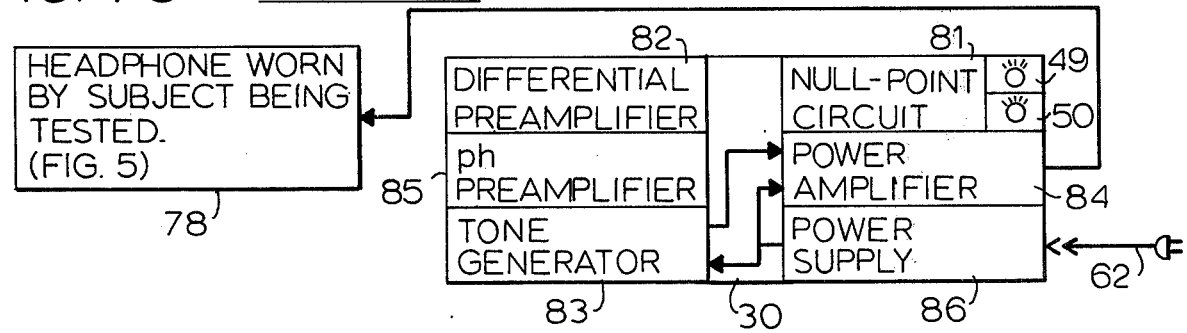
FIG. 4-C   AUDIOMETER
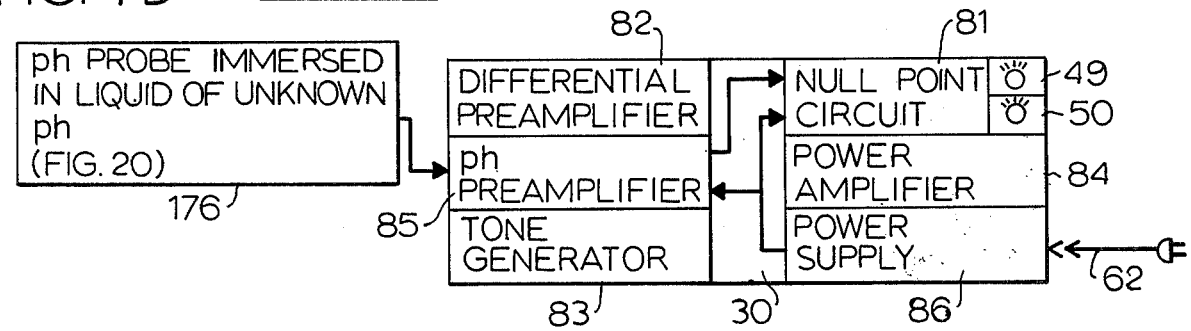
FIG. 4-D   ph METER

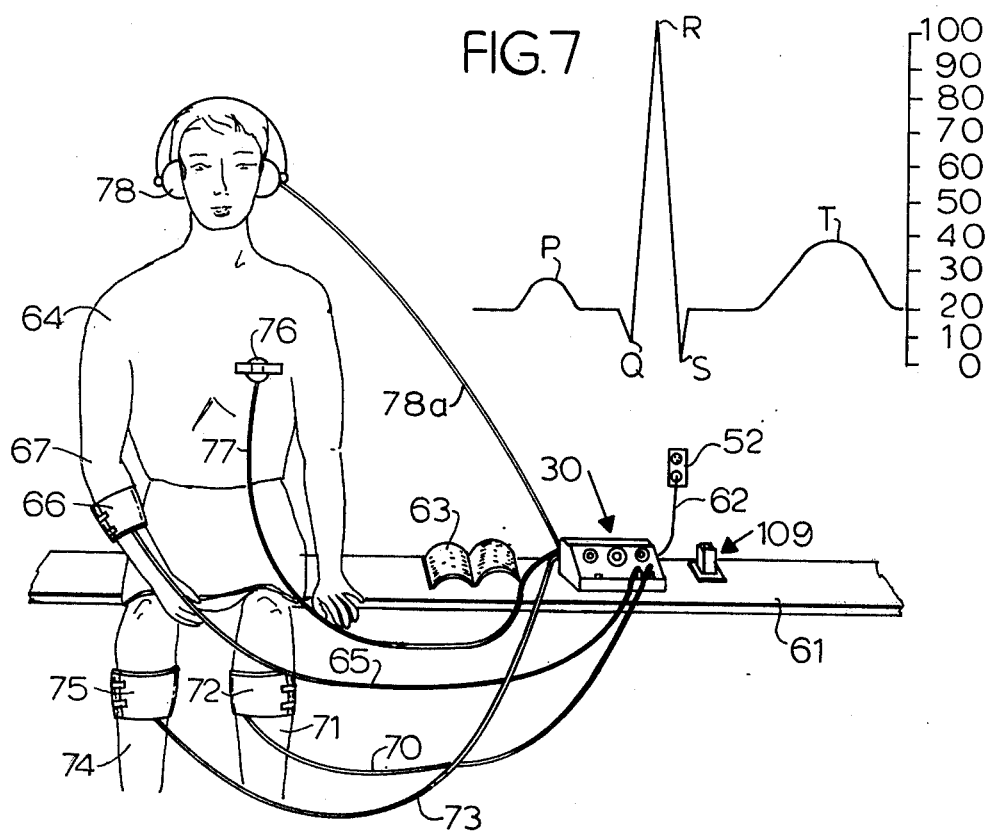
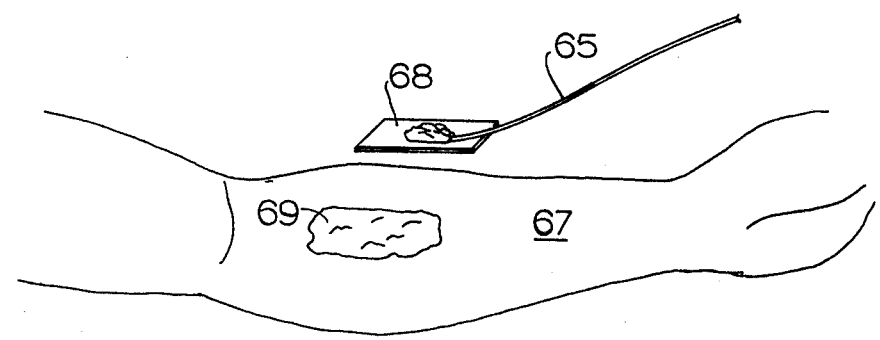

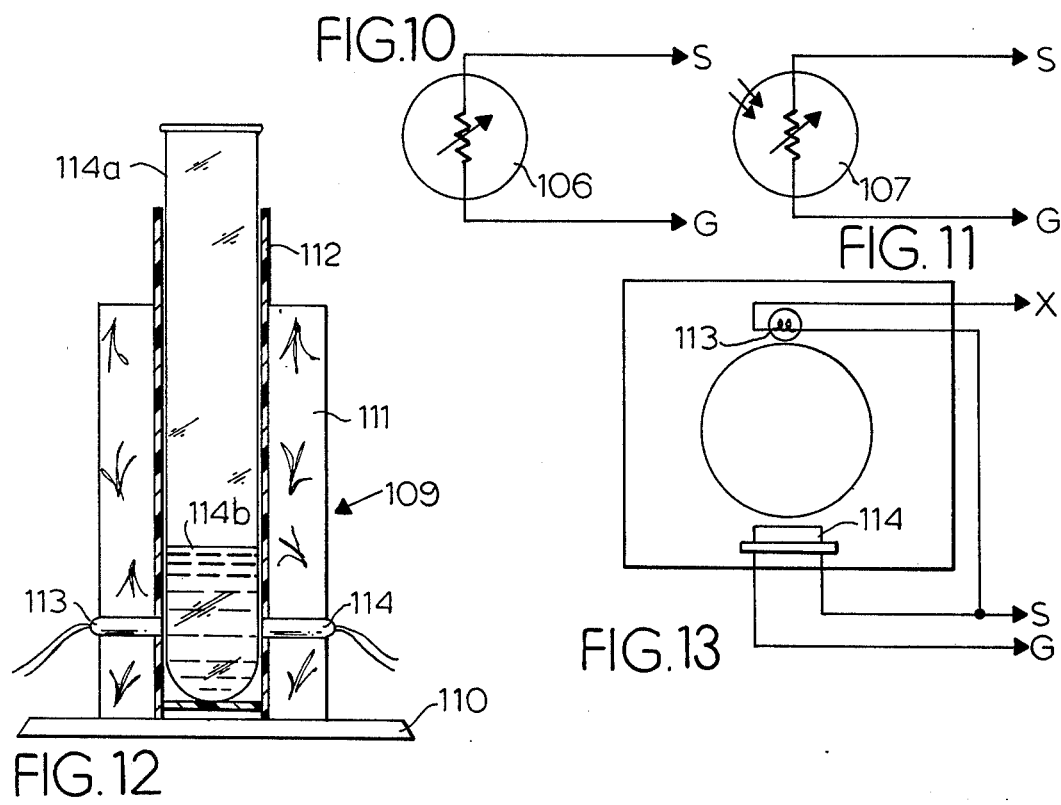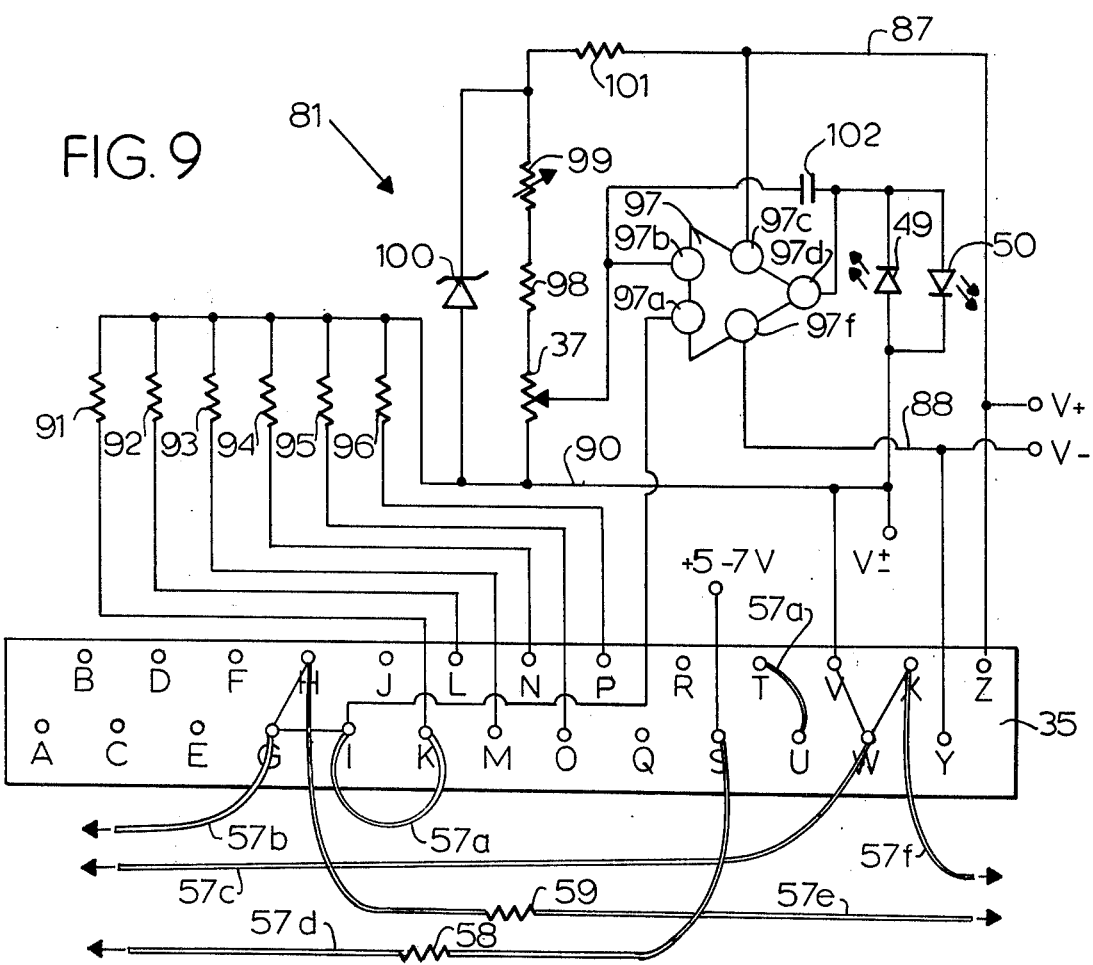

STUDENT-PROGRAMMABLE EDUCATIONAL INSTRUMENTATION DEVICE

The present invention was made incident to National Science Foundation Grant No. TES72-05819.

BACKGROUND OF THE INVENTION

The present invention relates to educational apparatus. More particularly this invention provides a student-programmable electronic instrumentation device and system for use in teaching students at the high school or junior college level how to provide instrumental circuits enabling them to measure physical and biological phenomena and also for teaching problem solving in the biological and scientific fields. It aids in teaching instrumentation, measurement of phenomena, and understanding of the phenomena.

Scientific instumentation employing electronic principles has long been known and has been widely used in the fields of research and higher-level education. The instruments have typically been very sophisticated, delicate, and expensive and have often necessitated a rather thorough understanding of their operative principles by users before they could be utilized effectively. Also, such instruments were highly specialized; generally, limited to work with one type of phenomena and completely unsuited to making measurements of unrelated or distantly related phenomena. Further, those prior art instruments were designed primarily for use by scientists, engineers, and technicians in industrial and scientific research, development, testing, and maintenance and in the health care fields of research and clinical diagnosis. They were not designed for use by high school and junior college students.

Heretofore, no single instrumentation device has been provided primarily for high school and junior college students and teachers as an instruction aid usable over a broad spectrum of curricula ranging from the life sciences of biology, zoology, botany, physiology, botany, and biomedical technology through the physical sciences of chemistry, physics and electronics. Further, the complexity, delicacy, high cost, and inflexibility of existing instruments discouraged many high school teachers and school districts from using them as instructional aids, much less making them widely available for use and handling by students. Thus, such instruments were rarely, if ever, available to students as learning tools to enhance interest and understanding of scientific and technological principles and techniques.

Furthermore, there has heretofore been no multipurpose device enabling the teaching and appreciation of instrumentation for measuring various phenomena of widely differing types and to do so at the high school and junior college level, while also inculcating an appreciation of accuracy and how it is obtained.

OBJECTS OF THE INVENTION

One object of the present invention is to provide an instrumentation device and system for use by high school and junior college students as a learning aid for subjects of study involving the generation, detection, measurement or testing of physical or biological phenomena.

Another object is to provide a device for aid in teaching scientific instrumentation and measurement.

Another object of the present invention is to provide an instrumentation device and system capable of being programmed to each of a series of specific tasks or functions by a high school student or other learner equipped otherwise with nothing more than insulated wires having the ends thereof stripped free of insulation.

A further object of the present invention is to provide a rugged and safe instrumentation device which is capable of measuring phenomena with relatively high accuracy.

Another object of the present invention is to provide an instrumentation device that is safely inoperative until proper operating conditions are provided by the student.

Yet another object of the present invention is to provide high school students or other learners with an appreciation and a progressive working understanding of the applications, operation, and circuitry of scientific instrumentation in today's technologically oriented world.

A still further object of the present invention is to provide a multi-programmable instrumentation device which is characterized by simplicity and safety of design, reliability in operation, and ease of understanding and use and which has a low construction cost, so that it may be available to and used by high school students and other learners everywhere.

SUMMARY OF THE INVENTION

The student-programmable education instrumentation device of the present invention accomplishes the foregoing and other objects by providing a plurality of programmably selectable electronic circuits within a suitable housing. The exterior of the housing includes (1) a control panel having plural controls and certain input jacks connected to some of the circuits, (2) a program panel having plural plug-in receptacles to which the circuits are also connected, and (3) a visual display output indicator device. The receptacles are spaced apart and are uniformly sized to engage a bare end of an insulated program wire. Thus, the circuits within the housing may be programmed into a wide variety of instruments by interconnecting selected pairs of receptacles with wires having their ends stripped free of insulation, as with a simple wire stripping tool. Other wires are plugged into selected receptacles to provide input and output connections for the instrumentation desired.

One of the circuits within the housing, called a null-point circuit, generates a reference signal which can be adjusted by a variable control member. This circuit also functions to compare the reference signal with an unknown input signal provided at one of the jacks or receptacles, and generates therefrom a comparison signal as a measurement of the unknown signal. The visual display device may be a pair of parallel reverse-polarity-connected light-emitting diodes mounted on the housing and connected to display the comparison signal. The display indicates a null-point when adjustment of the control member equates the reference signal to the input signal. Calibrations are provided on the control member, and conversion tables may also be included, so that the null-point may be converted into a quantitative measurement.

The instrumentation device also includes inside the housing, a plurality of calibrated variable amplifier and generator circuits, each of which may be operably connected at the program panel or in combination with the null-point circuit or other circuits to provide multiple instrumentation functions including, without limitation, the generation of continuously variable audio-frequency sine waves and the measurements and display of current, voltage, resistance, light levels, temperature, pH, heart beats, brain waves, etc. Thus, the instrumentation device becomes a selected particular instrument within a virtually unlimited range of distinct electronic instruments in accordance with program interconnection at the program panel. In this manner the device of the present invention programmed by the student, following suitable guidance, provides the student with a voltmeter, an ammeter, an ohmmeter, a thermometer, an light meter, a colorimeter, an oximeter, an electrocardiogram indicator, and electroencephalogram indicator, an electromyogram indicator, an electronically amplified stethoscope, an audiometer, a waveform generator, a direct current power supply and many other distinct instruments.

A power supply is included within the housing to provide for the included circuits and to provide a source of reference and supply voltages at the program panel, to provide power for input sensors which require power, and to provide external power needed for some experiments, tests and measurements, such as electrochemistry and electrolysis.

A variety of input sensors, probes, and devices are provided for use by students as part of the instrumentation system. These accessories may include a colorimeter, a thermistor, a pH probe, a photodiode, a microphone, body electrodes and probes with conductive tips. These input devices are connectible to the circuitry in the housing either through the input jacks in the case of low level sensors having shielded leads or receptacles in the case of high level sensors having unshielded leads.

The instrumentation device of the present invention is first presented to student as a programmable "black box" that will measure a combination of selected phenomenon, provided the student carefully follows hookup, programming and operational instructions. After the student becomes familiar with the myriad uses and acquires skill in operating the device as a programmed instrument, the student is then taught how the various circuit elements of the device function electronically. once the student understands how the circuit elements operate he is encouraged to program the device to accomplish instrumentation functions in novel settings. Thus, students in biology and pre-medical and health care professional curricula will utilize the device in physiological environments whereas students in the physical sciences and mathematics will program the device into test instruments and analog computers for measuring phenomena of chemistry, physics and calculating mathematical parameters.

Other objects, features, and advantages of the invention will become apparent from the following description of an illustrative preferred embodiment.

BRIEF DESCRIPTION OF THE DRAWINGS

FIG. 4A is a functional block diagram of the instrumentation device of FIG. 1 programmed as an electrical multimeter.

FIG. 4B is a functional block diagram of the instrumentation device of FIG. 1 programmed as a biomedical indicator.

FIG. 4C is a functional block diagram of the instrumentation device of FIG. 1 programmed as an audiometer.

FIG. 4D is a functional block diagram of the instrumentation device of FIG. 1 programmed as a pH meter FIG. 5 is a perspective view of a classroom environment showing the educational instrumentation device of FIG. 1 resting on a work surface. Various input sensors are shown connected to a human subject who is wearing headphones for listening to his own heartbeat, as sensed and amplified within the instrument. A colorimeter sensor is also shown, along with an instruction manual.

FIG. 6 is a fragmentary view of a portion of the right arm of the human subject shown in FIG. 4, illustrating a procedure for attaching an electrode to the arm.

FIG. 7 is a waveform diagram of the electrical signal corresponding to heartbeat, obtained in FIG. 4 and typically referred to an an electrocardiogram.

FIG. 9 is a schematic circuit diagram of a null-point circuit suitable for use as the null-point circuit of FIG. 7, the program panel and the circuitry being connected thereto as shown in FIG. 2.

FIG. 10 is a schematic diagram of a temperature sensor for use with the null-point circuit of FIG. 8.

FIG. 11 is a schematic diagram of a light sensor for use with the null-point circuit of FIG. 8.

FIG. 12 is a view in front elevation and in section of the colorimeter sensor assembly shown in FIG. 4, which is used with the null-point circuit of FIG. 8.

FIG. 13 is a somewhat schematic top plan view of the colorimeter sensor assembly shown in FIG. 11.

DETAILED DESCRIPTION OF THE PREFERRED EMBODIMENT

Figure 1:
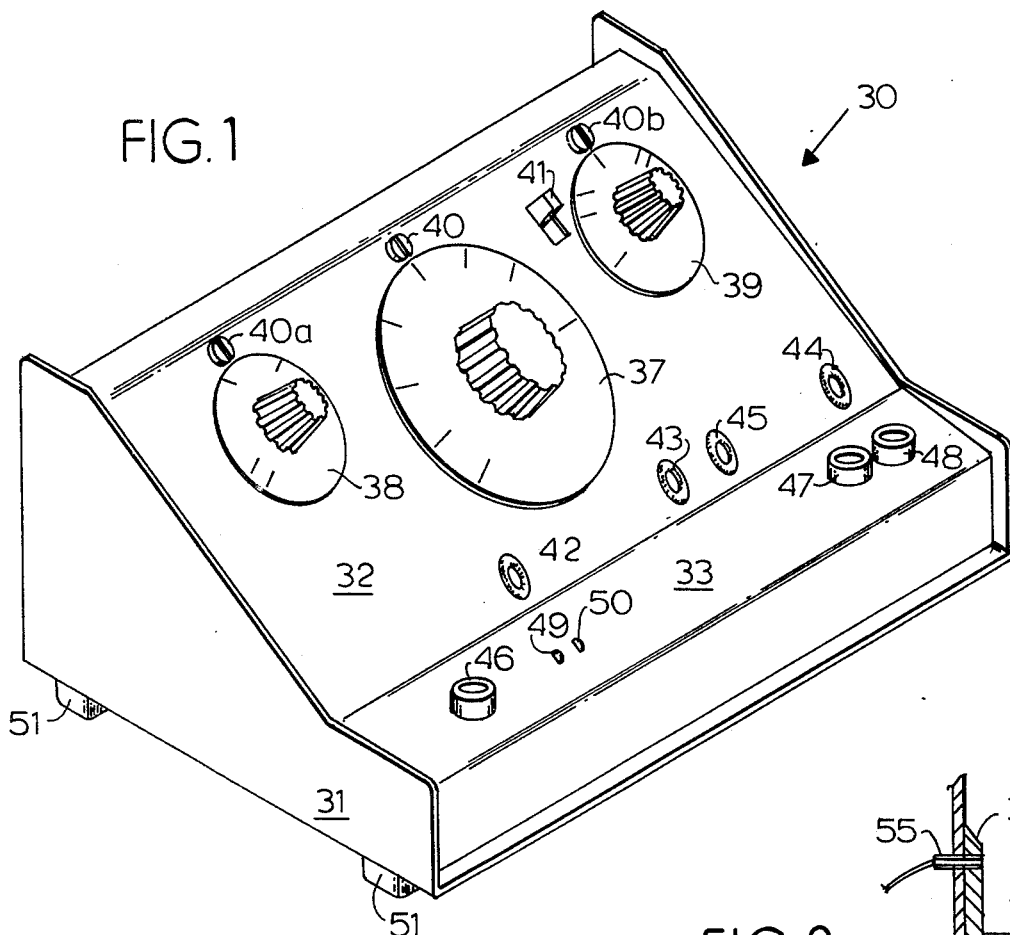
FIG. 1 is an isometric view of a student-programmable instrumentation device embodying the principles of the invention and showing its front control panel and its jack and indicator panel.
Figure 2:
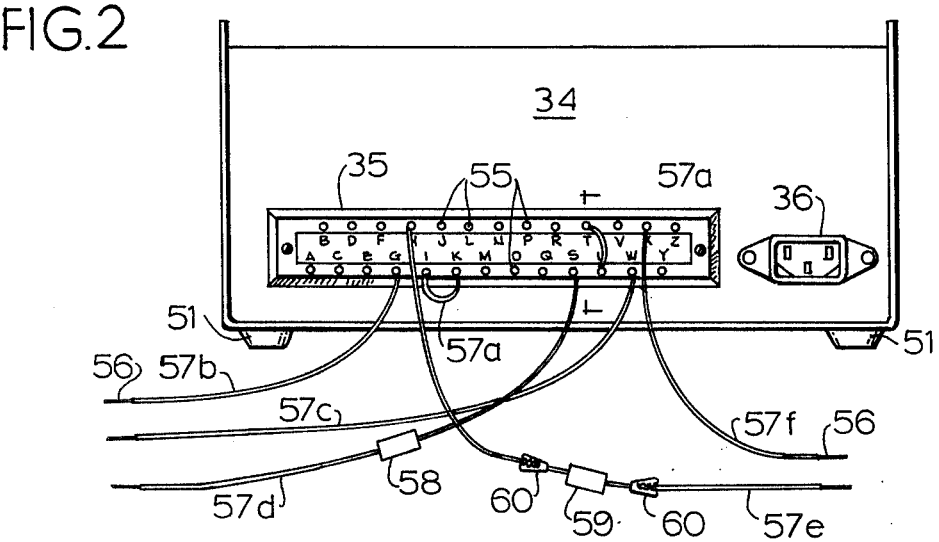
FIG. 2 is a rear view in elevation of the educational instrumentation device of FIG. 1 showing the program panel, with some lead wires connected to the panel to provide input and programming.

In accordance with the present invention, the student is initially introduced to an educational student-programmable instrumentation device 30 incorporating suitable circuitry and controls as shown in FIGS. 1, 2 and 4. The device 30 has a suitable housing 31, which includes a sloping control panel 32, a jack and indicator deck 33 at the base of the control panel 32, and a rear panel 34, shown in FIG. 2, the rear panel 34 includes a program board 35 and a grounded power jack 36 for connection to a line cord 62, not shown in FIG. 2 but shown as connected to a wall outlet 52 in FIG. 4.

The Control Panel 32 (FIG. 1)

The control panel 32 is a primary element of the device 30 and is explained to the student as including a series of controls which may be manipulated by the student during the course of operation of the instrumentation device 30. There are three calibrated rotatable controls: a range or balance control 37, an amplifier gain control 38, and a frequency control 39. All of the controls, jacks and receptacles are initially explained in general terms to the student. Then, as the student is taught to program the device into a particular instrument, the use and operation of the controls associated with that instrument are explained in detail.

Centered above and adjacent to the calibration of the controls 37, 38, and 39 are respective cross marks 40, 40a and 40b enabling the student to read the calibrations of the controls. The control panel 32 further includes a frequency range slide switch 41, a variable voltage control 42, a pH calibration control 43, a preamplifier gain control 44 and a pH range spread control 45. The controls 42, 43, 44 and 45 are for calibration purposes and are adjusted only infrequently, and therefore they are recessed behind the control panel 32 and are adjustable only with an adjustment tool such as a small screwdriver.

The Jack and Indicator Deck 33 (FIG. 1)

Figure 19:
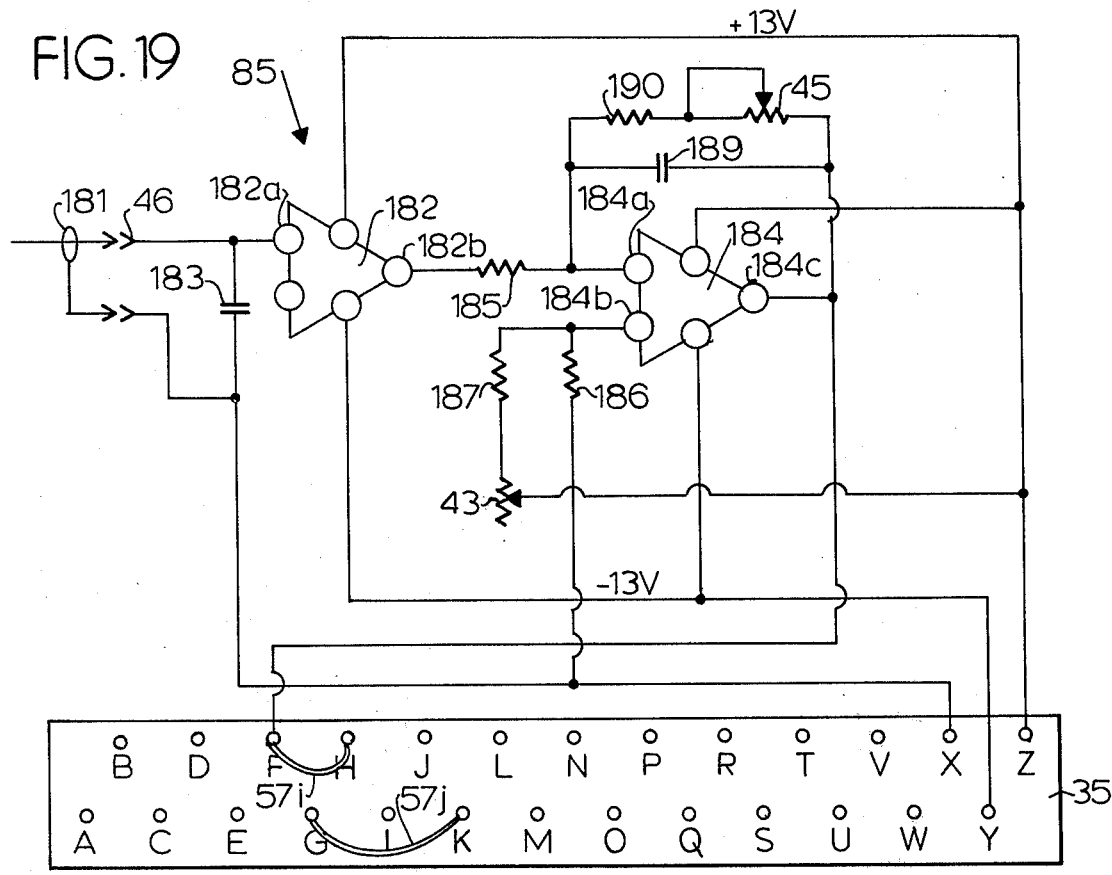
FIG. 19 is a schematic circuit diagram of an illustrative pH preamplifier circuit for FIG. 8, shown in conjunction with the program panel.

The jack and indicator deck 33 includes an input jack 46, enabling connection of a pH sensor (shown in FIG. 19). Two additional input jacks 47 and 48 are provided for connection of low-level sensor probes to a high-gain balanced differential preamplifier (illustrated in FIG. 15) within the instrumentation package 30. A visual output indicator is provided by two light-emitting diodes 49 and 50 which are mounted for convenient viewing in the jack and indicator deck 33. The diodes 49 and 50 are oppositely connected in parallel to the same signal bus so that the presence as well as polarity of an output signal may be visually observed.

The bottom plate of the housing 31 may be provided with four rubber feet 51, which keep the instrumentation device from slipping across smooth work surfaces commonly encountered in classrooms and laboratories.

Figure 3:
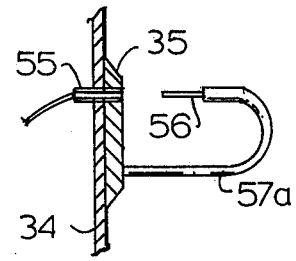
FIG. 3 is a fragmentary view in section of the program panel taken along the lines 3—3 in FIG. 2, showing a program wire extracted from its receptacle in the program panel.

The Program Panel 35 (FIGS. 2 and 3)

The program panel 34 includes a plurality of spaced apart receptacles 55 of uniform size to receive and hold the bare ends 56 of program and interconnect wires 57. Each receptacle 55 expands slightly when a wire end 56 is inserted, so that the end 56 is grasped in a tight interference fit and a good electrical connection is obtained. No special program wires are needed with the program panel 55, and any wire may be used so long as it is of the correct diameter and the insulation has been removed from the ends thereof. In the present embodiment 24-gauge solid conductor wire has been used with excellent results. Ordinary insulation strippers may be used by student operators to strip the insulation off of the end of commonly available hookup wire, such as No. 24 solid conductor plastic sheathed wire. With that size of conductor wire Molex soldercon transistor terminals provide effective receptacles, 55.

Electrical Multimeter Program Illustration (FIGS. 2, 4A)

A fundamental circuit element of the instrumentation device is a null-point circuit 81. Essentially this element is a bridge circuit employing a voltage comparator and provides a visual null-point indication at the display diodes 49 and 50 when, by rotation of the balance control 37 the bridge becomes balanced and a null-point reached. This circuit is particularly useful for measuring unknown voltage, current, or resistance and any phenomena which may be translated proportionally into voltage, current or resistance. Thus, the student first encounters the device 30 in connection with measuring voltages, currents, or resistances, either directly, in physics or chemistry courses, or indirectly in combination with e.g. thermistors to provide an indicating thermometer, in life science courses.

Figure 8:
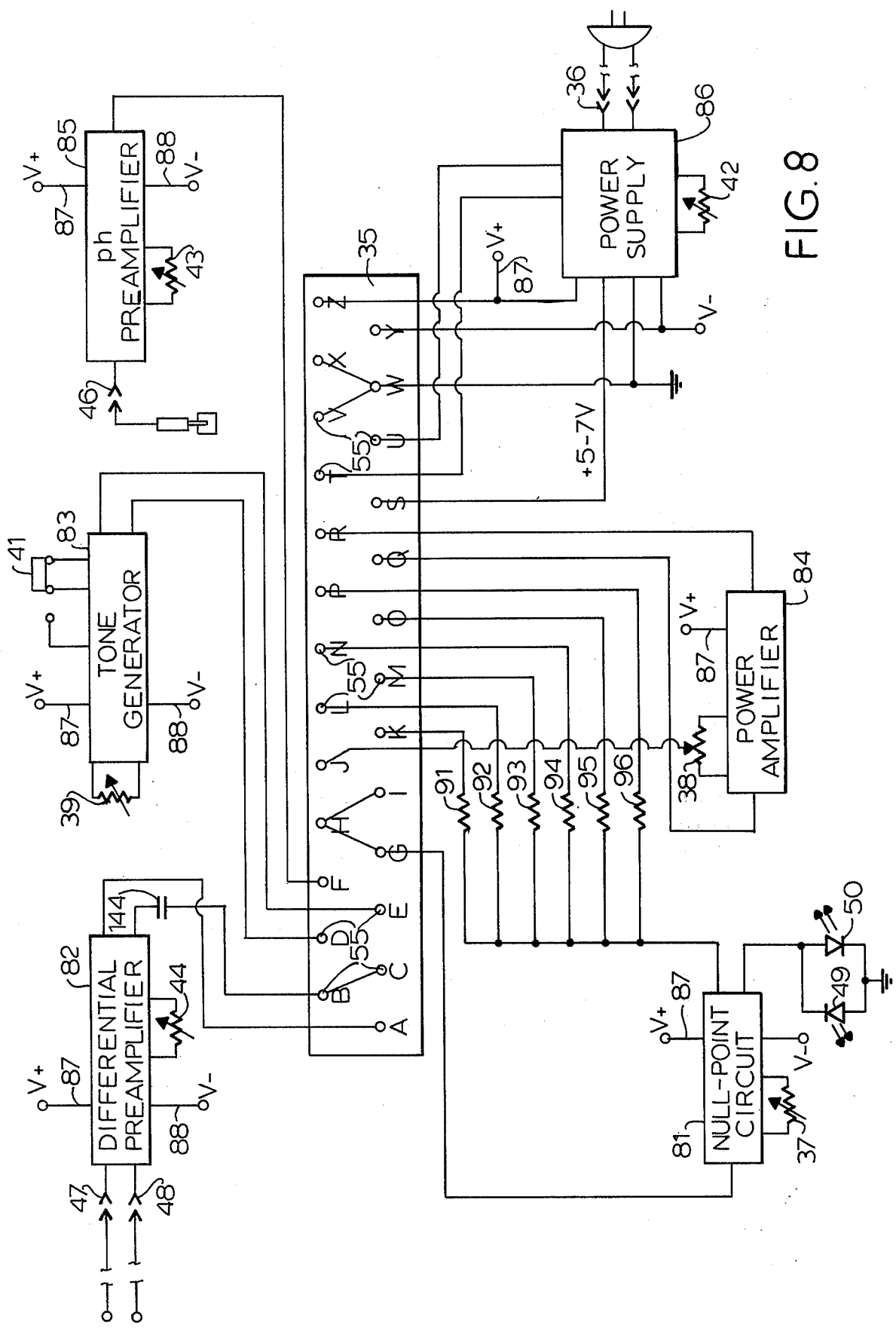
FIG. 8 is an overall block diagram of the circuits included in the educational instrumentation device of FIG. 1; internal connections of the circuits to the program panel is also shown.

The circuitry of the null-point circuit 81, described herein in connection with FIG. 8, is not initially presented to the student. Rather, the device 30 is described as capable of achieving desired functional results through correct programming. FIG. 4A illustrates generally the functional configuration of the device 30 after it has been programmed as an electricl multimeter by the student. Input probes are connected to the null-point circuit which is provided with operating power from the power supply. The device 30 is energized by power from a line cord 62 which is plugged into a wall outlet 52 only after the student has verified correct programming and connection of probes in accordance with instructions.

Other exemplary functions configurations are illustrated in FIGS. 4B, a biomedical indicator, FIG. 4C, an audiometer, and FIG. 4D, a pH meter.

Figure 16:
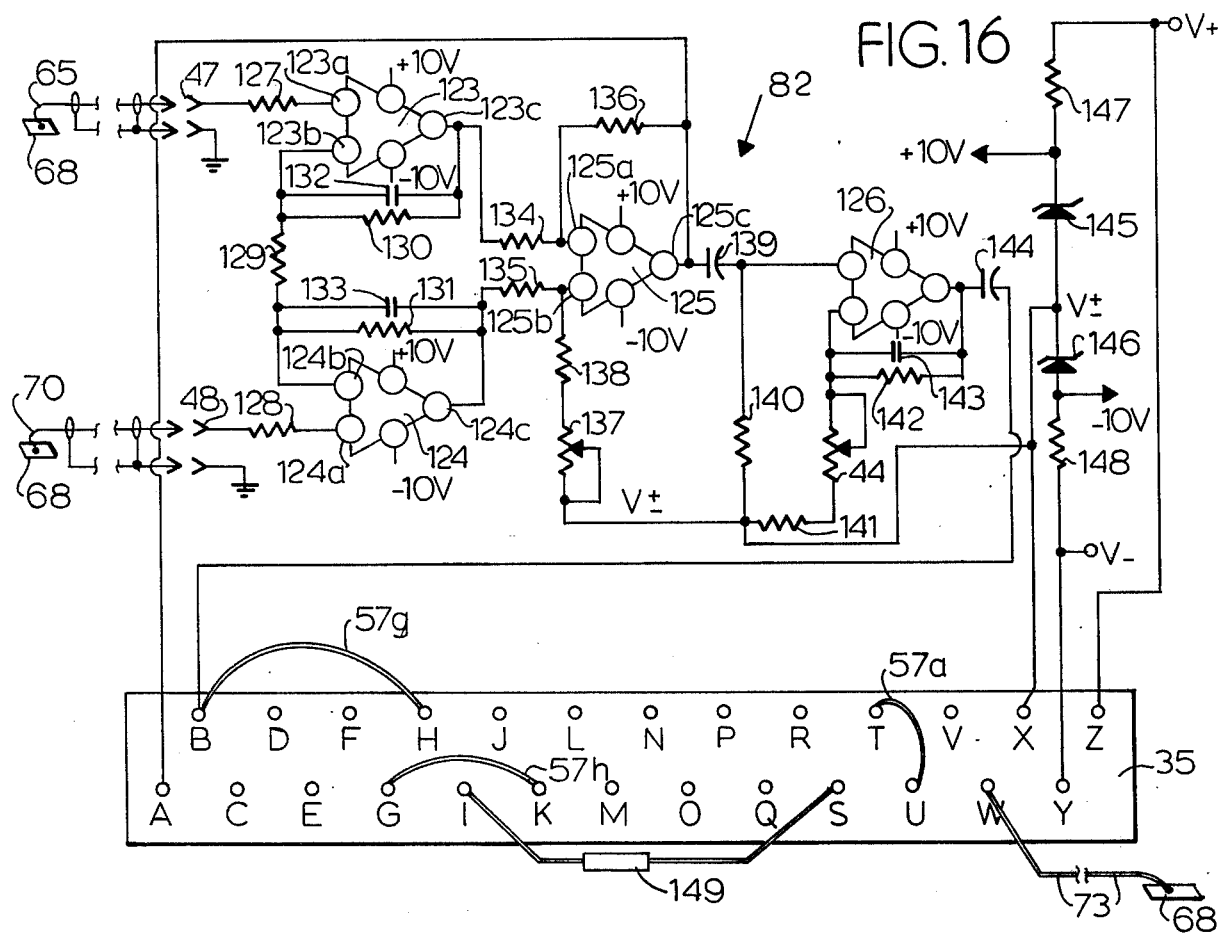
FIG. 16 is a schematic circuit diagram of a differential preamplifier circuit illustrative of such a circuoit for use in the circuit of FIG. 8, where it may be used in conjunction with the body sensors shown in FIG. 4; the program panel is also shown circuit in elevation.
Figure 18:
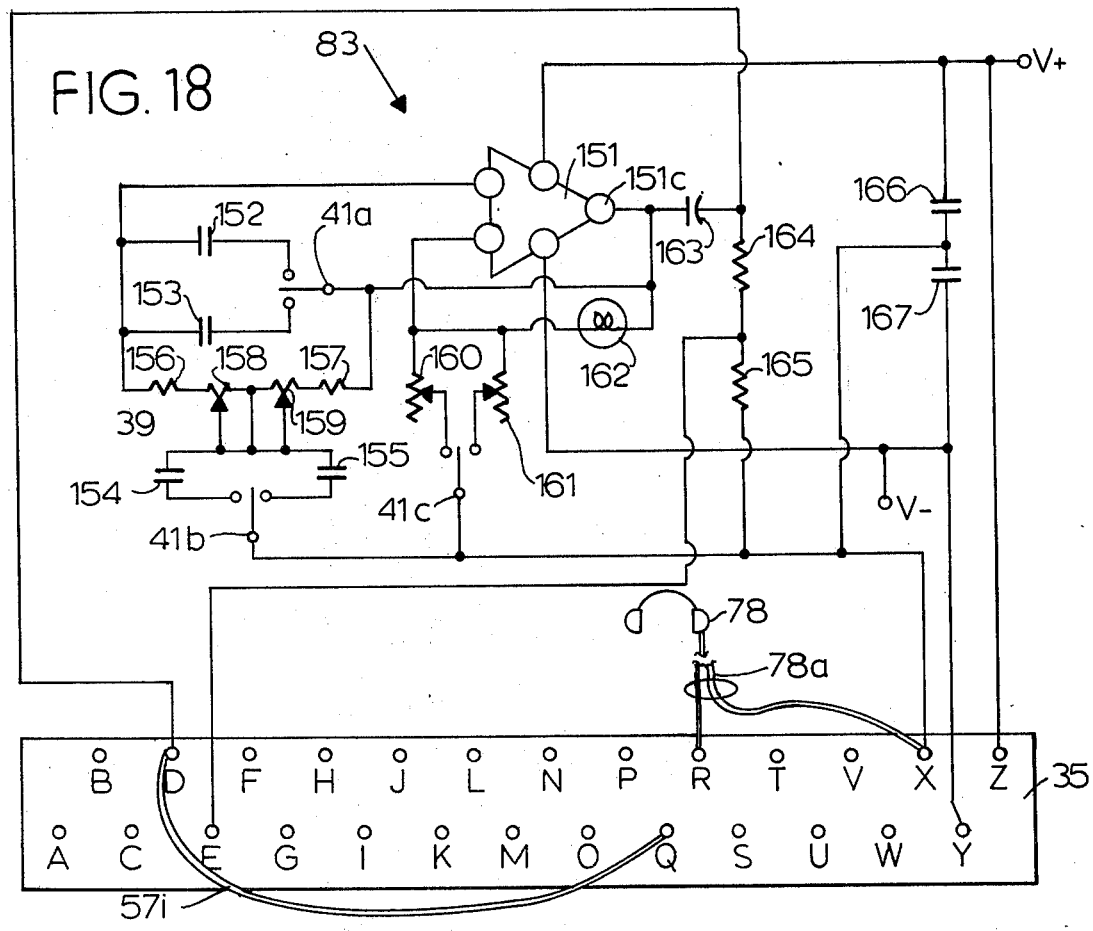
FIG. 18 is a schematic circuit diagram of an illustrative tone generator circuit of the type useful in the circuit of FIG. 8, shown in conjunction with the program panel.

Each of these—as well as many other—configurations is accomplished by program wire interconnections at the program panel 35. Typical programming required for the biomedical indicator of FIG. 4B is illustrated in FIG. 16, that required for the audiometer is illustrated in FIG. 18, and typical progamming for the pH meter is shown in FIG. 19. The configurations illustrated in FIGS. 4A, 4B, 4C and 4D are illustrative of a few of the many different instruments that may be provided by different programming of the same instrumentation device 30.

An illustrative programming hookup of the device 30 to form the multimeter of FIG. 4A is illustrated in FIG. 2, where plural wires 57 are shown inserted into various receptacles 55. Twenty-six receptacles 55 are shown in the illustrative program panel 35, each receptacle 55 being identified with an adjacently positioned letter of the alphabet, A through Z. The internal connections of the receptacles 55 are shown in FIGS. 7 and 8, discussed hereinafter.

In FIG. 2, program wires 57a interconnect selected pairs of receptacles 55 (I to K and T to U) to set up a program connecting circuitry contained within the housing 31. Interconnect wires 57b and 57c are connected to and lead from receptacles 55G and 55W; these wires 57b serve an input probes for the measurement of electrical current flow, and each end 56 is stripped of insulation. Electrical resistance may be measured by using the wire probe 57c in conjunction with the wire 57d, which is connected to receptacle 55S. A current limiting resistor 58 is shown here series-connected to two segments of the wire 57d, e.g. by soldered connections. Voltage may be measured with wire probes 57e and 57f which are respectively connected to receptacles 55H and 55X. A voltage dropping resistor 59 is shown here series-connected to two segments of the lead 57e, e.g. by alligator-type clips 60. Either connection by soldering, as with the resistor 58, or by alligator-type clips 60, as with the resistor 59, is entirely satisfactory.

Examples of Biomedical Instrumentation (FIGS. 5-7)

Several of many applications of the programmable instrumentation device 30 to biomedical technology instruction are illustrated in FIG. 5. Therein, the device 30 is shown resting on a work surface 61. The power cord 62 having a ground lead provides line voltage from a grounded wall socket 52 to the instrument via the power jack 36 (shown in FIG. 2).

An instruction manual 63 lies open on the work counter 61. In addition to instructional material, it contains hookup directions, operating instructions and illustration, conversion and interpolation tables, and nomographs, so that a student operator is guided throughout the programming and operating of the instrument 30, with or without direct teacher supervision. Thus, it can be appreciated that the instrument 30 is particularly useful for self-paced programmed instruction as well as teacher-supervised learning.

Electrocardiogram Indicator

The device 30 is configured as a biomedical indicator as shown in FIG. 4B with a balanced preamplifier programmably connected to the null-point circuit. The acutal programming hookup is illustrated in FIG. 16. in the educational environment such as a laboratory classroom, a partially clothed human subject 64 is shown seated upon the counter 61. A shielded sensor wire 65 extends from a wrapping 66 on the subject's right arm 67. As shown in FIG. 6, the wire 65 is connected at its outer end to an electrode 68. A conductive salve or compound 69 may be applied to the area of the arm 67 to which the electrode is to be attached. Then the electrode 68 may be held firmly against the arm of the bandage wrapping 66 as shown in FIG. 4. The other end of the shielded wire 65 is plugged into one of the input jacks 47 or 48 that is connected to the differential preamplifier 82 described later.

Another shielded sensor wire 70 is attached at one end to an electrode which may be identical with the electrode 68 and is held firmly against the subject's left leg 71 by another bandage-type wrapping 72 in the manner illustrated in FIGS. 4 and 5. The other end of the wire 70 is plugged into the other of the input jacks 47 or 48. An unshielded ground wire 73 is connected to another electrode similar to the electrode 68 and held to the subject's right leg 74 by another pressure wrapping 75, also in the manner shown in FIGS. 4 and 5. The other end of the ground wire 73 is inserted directly into one of the ground connected receptacles 55V, 55W, or 55Z of the program panel 35 of FIG. 2.

For this experiment, the instrumentation device is programmed and adjusted so that electrocardiographic (ECG) pulses from the subject 64 are amplified and then displayed as periodically repeating flashes of the display diode 49 and 50. A typical ECG waveform of approximately a half second duration is shown in FIG. 7. Depending upon the setting of the balance control 37, a variety of flashes will be viewable for each heartbeat. If the null-point happens to be set at calibration level 100 of FIG 7, no flashes will be observed. At the calibration level 25 of FIG. 7 positive pulses identified as the P, R and T components of the ECG waveform will appear as light flashes on the positive polarity diode 49 whereas at a level of e.g. 15 negative going pulses identified as Q and S of the ECG waveform will appear as light flashes on the negative polarity diode 50. The electrical circuitry and programming used in displaying the ECG waveform as light pulses is explained hereinafter in connection with FIG. 16.

Electronic Stethoscope

Also shown in FIG. 5 is a sensitive high output contact microphone 76 which is taped against the chest of the subject 64. For this experiment a lead 77 from the microphone 76 is connected to the input of the power amplifier (shown in FIG. 17) directly at the program panel 35. Headphones 78 being worn by the subject 64 are connected at the program panel 35 to receive the amplified heartbeat signal from the power amplifier via a connecting wire 78a. Sound level is controlled by adjustment of the amplifier gain control 38. Thus, the subject 64 may hear his own heartbeat and may thereby discern the correlation thereto of the electrocardiographic pulses as visually displayed at the programmed instrument 30.

Overall Circuit Organization (FIG. 8)

Figure 21:
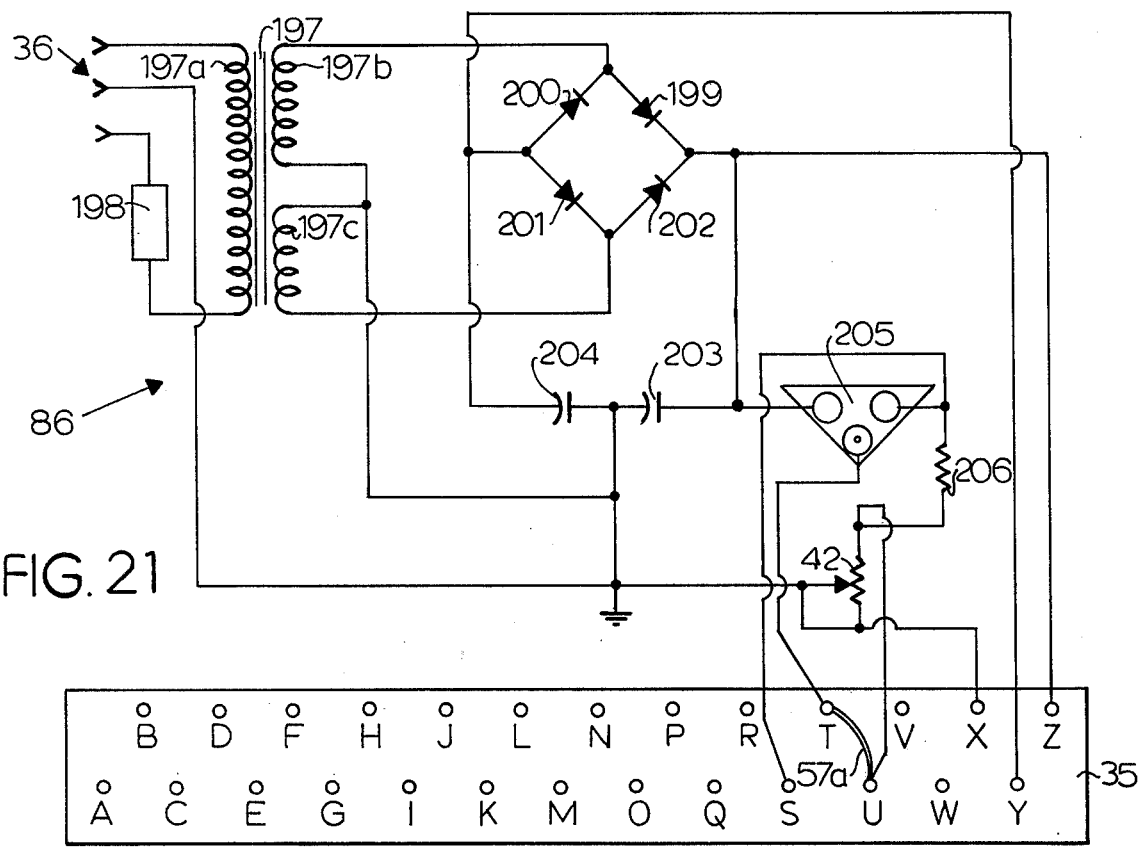
FIG. 21 is a schematic circuit diagram of a suitable power supply circuit useful in the circuit of FIG. 8.

The circuitry of the programmable educational instrumentation device is set forth in the detailed functional block diagram of FIG. 8; it includes six major circuit subsystems: a null-point circuit 81 (an illustrative diagram is shown schematically in FIG. 9); a high gain differential preamplifier 82 (e.g., as shown in FIG. 16); a tone generator 83 (e.g., as shown in FIG. 18); a power amplifier 84 (e.g., shown in FIG. 17); a pH preamplifier 85 (e.g., shown in FIG. 19); and a power supply circuit 86 (e.g., shown in FIG. 21). Each of the circuits is connected to the program panel 35 in the overall wiring configuration, as shown in FIG. 8. The power supply circuit 86 is directly connected to each of the other circuits 81, 82, 83, 84, and 85 via V+ and V− supply buses 87 and 88 to provide required operating voltages. The power supply additionally provides plus and minus 13 volts at pins 55Z and 55Y respectively. A regulated voltage, adjustable from plus 5 to 7 volts by rotation of the control 42 is provided at receptacle 55s.

The controls and jacks associated with each circuit are also shown in FIG. 8. Thus, the range or balance control 37 and the light emitting diodes 49 and 50 are shown to be part of the null-point circuit 81, which also includes six range selection resistors 91, 92, 93, 94, 95 and 96 connected to receptacles 55K, 55L, 55M, 55N, 55O and 55P, respectively. The two differential preamplifier input jacks 47 and 48 and the preamplifier gain control 44 are shown in connection with the differential preamplifier circuit 82. The frequency contrl 39 and the frequency range slide switch 41 are shown in connection with the tone generator 83. The amplifier gain control 38 is shown in connection with the the power amplifier circuit 84. The pH sensor input jack 46 and the pH calibration adjustment control 43 are shown in connection with the pH preamplifier 85. And, the voltage adjustment control 42, a grounded power jack 36 and the line cord 62 are shown with the power supply circuit.

Null-Point Circuit 81 (FIG. 9)

As previously explained in connection with FIG. 2 and the functional diagram of FIG. 4A, the null-point circuit 81 provides the basic measuring element of the device 30 for measuring any phenomena that can be ultimately related or analogized to direct current or voltage. An integrated circuit operational amplifier 97 is connected as a very high gain differential amplifier, having a gain on the order of about 100,000. A type ua 741 operational amplifier, made by Fairchild Semiconductor Corporation, or equivalent, has been found to work with excellent results. One input, pin 97a of the amplifier 97, is connected to one of the receptacles 55G, 55H and 55I of the program panel 35. As previously noted in connection with FIG. 2, a wire 57b which serves as a test lead for current measurements is connected to receptacle 55G.

The current range of the null-point circuit 81 is determined by a connection of a program wire 57a from the receptacle 55I to one of the range resistors 91, 92, 93, 94, 95, 96 which are respectively connected at receptacles 55K through 55P. In FIGS. 2 and 9, the lowest current range is selected by the program wire 57a being connected between receptacles 55I and 55K so that the first input, 97a is shunted with the range resistor 91, which may be a 1,000 ohm resistor. The resistor 92 may be 300 ohms, the resistor 93 may be 100 ohms, the resistor 94 may be 30 ohms, the resistor 95 may be 10 ohms, and the resistor 96 may be 3 ohms. Thus, when the shunt resistor 91 is selected by connection of the program wire 57a to the receptacle 55K the scale of the null-point circuit 81 is zero to one milliampere. At receptacle 55L the scale becomes zero to three milliamperes, at 55M the scale is zero to ten milliamperes, at 55N the scale is zero to thirty milliamperes, at 55O to scale is zero to one hundred milliamperes, and at 55P the scale is zero to three hundred milliamperes.

Within the null-point circuit 81, the range resistors 91 through 96 are connected to a common point bus 90 which is in turn connected to the receptacles 55V, 55W and 55X of the program panel 35. The other input, 97b of the operation amplifier 97, is connected to the wiper of the range control 37. The range control 37 is a variable resistor havng one end connected to the common point bus 90 and the other end connected to a series resistor 98 and through it to a variable resistor 99 which functions to calibrate the range control 37. A zener diode 100 is connected between the common point V+ bus 90 and a node between the variable resistor 99 and a fixed resistor 101. The other end of the resistor 101 is connected to a V+ voltage bus 87 so that the zener diode 100 provides a stable reference voltage to the range control 37 via the resistors 98 and 99.

The integrated circuit operational amplifier 97 is provided with V+ voltage at pin 97c. Output from the integrated circuit operation amplifier 97 is provided from a pin 97d to the light emitting diodes 49 and 50. A feedback capacitor 102 is connected between the output pin 97d and the input pin 97b to stabilize the operation of the amplifier 97.

The operation of the null-point circuit 81 will now be explained. Assume that probe wires 57b and 57c are connected in a circuit in which 0.2 milliampere of current flow. Assume the 0.2 milliampere current flows into the circuit through lead 57b, thence through the 1000 ohm resistor 91 and thence is returned through the lead 57c. Under these conditions, 0.2 volt will appear at receptacles 55g, 55h and 55i as well as at input pin 97a of the amplifier 97. At this point, one or the other of the diode lamps 49 or 50 will be illuminated. The range control 37 is then rotated to a point where 0.2 volt will be provided at the input pin 97b. At this point the output of the differential operational amplifier 97 is zero and neither light-emitting diode will be illuminated. This is called the null-point. At this point the student reads the calibration on the range control 37, which for this range will be 20. The instruction book 63 will then be consulted to determine that the conversion factor for the range set by connection to pin K is multiplication by 0.01. Thus, the current read will be 0.2 milliampere.

A wide variety of phenomena relatable to current or voltage may be measured with the null-point circuit 81. For example, FIG. 10 illustrates a temperature sensor 106 which may be a variable resistance element such as a thermistor. When current is passed through the temperature sensor element 106, as by a connection between receptacle 55Y and receptacle 55S of the program panel 35, changes in temperature are reflected by changes in resistance which are in turn measured by changes in voltage by the null-point circuit 81. A suitable conversion table correlating measured voltage to temperature is provided in the instruction manual 63.

Another exemplary application of the null-point circuit is illustrated in FIG. 11. Therein, a light detector such as a photoresistor 107 may be connected to the null-point circuit 81. Current is provided from the regulated voltage bus at receptacle 55S, through the photoresistor 107 and then to the null-point circuit input at receptacle 55G. Variations in light intensity sensed by the photoresistor 107 will be transformed into resistance variations resulting in proportionate variations in current flow at the pin G. As with measurement of temperature, the instruction manual 63 will include a conversion table to correlate measured current with light levels in accordance with the characteristics of the photoresistor 107. I prefer to use a semiconductor photoresistor of the type exemplified by No. VT-721 made by Vactec Corp. of St. Louis, Mo.

A further illustration of the null-point circuit 81 may be found in connection with the colorimeter 109 shown in FIGS. 12 and 13. Therein, the colorimeter 109 includes a stand 110 to which is secured a light-opaque housing 111. A vertically oriented cylinder 112 extends through the housing 111. Oppositely aligned and extending though the housing 111 and cylinder 112 near the base 110, are a fixed light source 113 and a photoresistor 114 of the same type as the photoresistor 107. The light source 113 may be a six-volt pilot lamp which is connected by wires to pins S and X of the program panel 35, so that voltage in the range of five to seven volts is provided to energize the lamp 113. The photoresistor 114 is connected to the null-point circuit 81 at receptacles 55S and 55Y. The cylinder 112 is sized to receive a test tube 115 closely therewithin. To calibrate the colorimeter, the test tube 115 containing a blank having zero concentration of the unknown solution is inserted in the cylinder 112. The illumination level of the lamp 113 is then adjusted by rotation of the five to seven volt supply voltage control 42. The amount of light received by the photoresistor 114 which is passed through the calibration blank then establishes the calibration point of the colorimeter. In operation, a liquid 116 having a higher but unknown opacity relative to the calibration blank is placed in a test tube 115, which is again inserted into the well defined by the cylinder 112. In this case less light is transmitted to the photodiode 114 through the liquid medium 116. Thus, less current flows through the photoresistor and a different null-point will be found with the range control 37. A conversion table in the instruction manual 63 may then be consulted to convert the current reading into quantitative colorimetric data. The colorimeter 109 is particularly useful in teaching concepts in chemistry and in physiology such as urinalysis and blood analysis.

Figure 14:
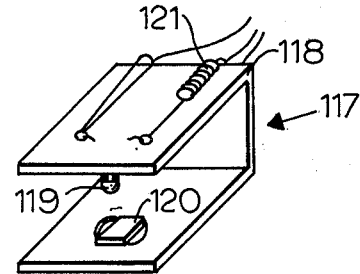
FIG. 14 is an isometric view of an oximeter sensor assembly, for use with the null-point circuit of FIG. 8.
Figure 15:
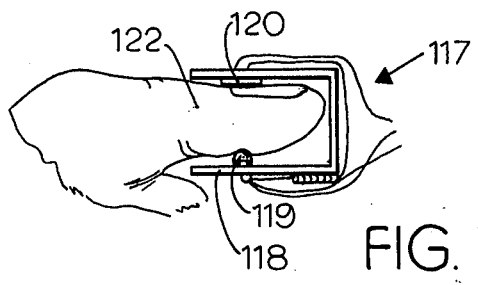
FIG. 15 is a view in side elevation of the oximeter sensor assembly shown in FIG. 13, with a human subject's thumb inserted into the assembly in the intended manner.

A specialized case of the colorimeter 109 is found in the oximeter 117 illustrated in FIGS. 14 and 15. In the oximeter adaptation, a U-shaped housing 118 supports in opposite alignment a light source 119 and a photodiode 120. A current limiting resistor 121 is connected in series with the light source 119. A thumb 122 of a human subject is placed into the space of the U-shaped housing 118 so that it lies entirely between the light source 119 and the photoresistor 120. The entire assembly is then wrapped with a light-opaque wrapping, now shown, so that extraneous light is entirely excluded. The light then passing from the light source 119 through the thumb 122 and to the photodiode 120 provides a measurement of the opacity of the thumb. The amount of oxygen in the blood supply will vary the opacity through the thumb 122 and thereby provide a relative indication of the amount of oxygen in the human subject undergoing testing. As with prior examples, conversion tables are provided in the instruction manual 63 so that quantitative data may be derived by the student from the oximeter experiment.

Bio-Electric Preamplifier 82, FIGS. 4B, 5, 6, 7 and 16

Most bio-electric signals are of very low voltage levels. For example, the electrocardiograph signal is about one millivolt. These low signals are completely swamped out by ambient power line alternating current, which radiates throughout our electric environment from line cords, lamp fixtures and electrical appliances, etc. Thus, any effective bio-electric preamplifier must utilize a high-gain differential amplifier to balance out unwanted signals. Such a differential amplifier will not amplify a signal which is equally present at both inputs; only the difference signal will appear at the output thereof. Therefore such a preamplifier will reject the ambient sixty-cycle alternating current and amplify a different signal which, in the case of the electrocardiograph, is being generated by the heart of the subject to which the sensors have been attached in a manner such as that shown in FIG. 5.

The circuitry of the bio-electric preamplifier 82 is set forth in a schematic diagram of FIG. 16. To obtain the necessary gain and balance, four integrated circuit operational amplifiers 123, 124, 125 and 126 are provided. These may be types ua 741 made by Fairchild Semiconductor Corporation or equivalent. Low level bioelectric signals are received at jacks 47 and 48. One signal path is through the input jack 47 and a current limiting series resistor 127 to an input 123a of the amplifier 123; another path is through the input jack 48 and current-limiting series resistor 128 to an input 124a of the amplifier 124. The other inputs 123b and 124b of amplifiers 123, 124 are connected together through a balance resistor 129. Feedback networks consisting of resistors 130 and 131 and shunt capacitors 132 and 133 are connected from the outputs of amplifiers 123 and 124 to their common inputs 123b and 124b respectively.

The output 123c from the amplifier 123 is connected to one input 125a of the amplifier 125 through a series resistor 124, and the output 124c of the amplifier 124 is connected to the other input 125b of the amplifier 125 through a series resistor 135. The amplifier 125 is a unity gain operational amplifier which functions to convert the differential outputs of the amplifiers 123 and 124 to an unbalanced non-differential output. A potentiometer 137 is connected in series with a fixed resistor which is in turn connected to the input 125b of the amplifier 125. The potentiometer 137 is returned to the common point (V+) bus 90 of the device 30. Adjustment of the potentiometer 137 enables maximization of common mode rejection of the amplifier 125. A direct-current output of the bioelectric preamplifier 82 is provided from the output 125c of amplifier 125 to the receptacle 55A of the program panel 35. In those instances where a direct-current output is appropriate, that output then may be obtained by connecting a wire to the receptacle 55A.

The amplifier 126 of the bio-electric preamplifier 82 is operated as an unbalanced high-gain amplifier having one of its inputs 126a connected to receive the output of the amplifier 125 through a blocking capacitor 139 and a shunt resistor 140. The input 126b of the amplifier 126 is connected to the common point bus (V+) 90 through the preamplifier gain control 44 and a series resistor 141 to the common point bus 90. The gain of the amplifier 126 is determined by the setting of the preamplifier gain control 44, which functions as a voltage divider in combination with a feedback network comprised of a resistor 142 and parallel capacitor 143 connected between the output of the amplifier 126 and the input, to which the potentiometer 44 is also connected.

An AC output with adjustable gain is provided at receptacle 55A of the program panel 35; that signal is taken from the output of the amplifier 126 through a blocking capacitor 144. Two zener diodes 145 and 146 are connected in series with the common node connected to the reference point bus 90. The cathode of the diode 145 is connected through a series resistor 148 to the V-bus 88 at receptacle 55Y of the program panel. The diodes 145 and 146 are used to drop and thereby stabilize and regulate the supply voltage to the preamplifier 82. Thus the cathode of the diode 145 provides e.g. +10 volts to the amplifiers 123 through 126 and the voltage at the anode of the diode 146 provides a −10 volts to those same circuits, V+ and V− being somewhat in excess of ±10 volts.

The programming of the program panel 35 which enables the instrument 30 to display visually the bioelectric signal such as ECG pulses is also illustrated in FIG. 16. A program wire 57a interconnects receptacles 55T and 55U; a program wire 57g interconnects receptacles 55B and 55H; a program wire 57h interconnects receptacles 55G and 55K. A high value resistor 149 is connected between pins 55I and 55S. The right leg sensor wire 72, shown in FIG. 5, is connected at its jack 47 and the sensor lead 66 is connected at the jack 48. It is to be understood that the high-value resistor 149 functions to bias the null-point circuit so tht the null-point will be away from zero.

With the subject 64 hooked upon as shown in FIG. 5, and the instrument 30 thereafter energized, the range dial 37 is then rotated to the null-point shown by the diodes 49 and 50. The electrocardiogram signal is then superimposed upon the null-point circuit, so that with each QRS waveform as shown in FIG. 7, the diode lights 49 and 50 will flash. Depending upon the setting of the range control 37, various portions of the ECG waveform will be displayed as light flashes of the diodes 49 and 50. For example, with the setting of the range control at 100, no pulse will be discerned. However, as the range control is decreased toward 20, the R pulse duration lengthens. When the range dial reaches about 25, the P pulse will be seen with the R pulse and T pulse on the positive diode light 49, and the Q and S pulses will become visible as negative pulses on the negative diode light 50 at a range dial setting of e.g. 15. While the foregoing illustration is related to the electrocardiogram, it is to be understood that the bio-electric preamplifier 82 of the instrument 30 may be used to display, with the null-point indicator, other bio-electric signals such as electroencephalogram pulses or brain waves and electromyelogram or muscle pulses.

Tone Generator 83, FIG. 18

Waveform generation in the audio range is provided by the tone generator circuit 83, which is shown schematically in FIG. 18. An integrated circuit operational amplifier 151 is configured as a Wien Bridge oscillator. The integrated circuit 151 may be type ua 741 made by Fairchild Semiconductor Corporation or the equivalent. The tone generator 83 has two frequency ranges, which are set by the position of the frequency range slide switch 41. That switch electrically comprises a three-pole doublethrow switch having poles 41a and 41c. The switch pole 41a selects between one of two feedback capacitors 152 or 153, which are connected to an input 151a of the amplifier 151. The switch pole 41b selects between two shunt capacitors 154 and 155. A series-resistance network comprising fixed resistors 156 and 157 and variable resistors 158 and 159 is interposed between the common node of the capacitors 152 and 153 and the switch pole 41a. The common node between the potentiometers 158 and 159 and the wipers thereof are connected to the capacitors 154 and 155. Resistors 158 and 159 provide in combination the calibrated frequency control 39. In practice, a two-section ganged potentiometer may provide the resistors 158 and 159.

Switch pole 41c selects between two waveform control potentiometers 160 and 161 and the common point bus. The potentiometers 160 and 161 are connected in common with another input 151b of the amplifier 151 and with a low current incandescent lamp 162 which is connected to the output 151c of the integrated circuit 151. The lamp 162 in combination with a selected one of the resistors 160 or 161 provides the feedback voltage needed to sustain oscillations of the tone generator 83 as well as to shape the output as a sinusoidal waveform. The resistors 160 and 161 and lamp 162 are connected to one of the inputs of the IC 151. The other input to the IC 151 is connected to the common node of the capacitors 152 and 153 and resistor 156. The output of 151c of the IC 151 is also provided to the node at the switch pole 41a and resistor 157. The output waveform is past through a blocking capacitor 163 and shunt resistors 164 and 165. A high level output is provided at the program panel 35 at receptacle 55D. An attenuated output is provided from the common node between resistors 164 and 165 to output receptacle 55E of the program panel 35. High value filtering capacitors 166 and 167 are connected from the common point bus 90 to the V+ and V− buses 87 and 88 respectively.

As illustrated functionally in FIG. 4C, the device 30 may be programmed to provide an audiometer by the connection of the output of the tone generator 83 to the input of the power amplifier 84. The output of the power amplifier is then supplied to headphones, such as the headphones 77 being worn by the subject in FIG. 4. The necessary program hookup is accomplished by connecting a program wire 57i from receptacle 55D to receptacle 55G. The wire pair 78 extending to the headphones has one wire connected to receptacle 55R, the output of the power amplifier, and the other receptacle connected to the common point bus 90 at receptacle 55X. Sound intensity is then controlled by the amplifier gain control 38 while frequency is set by rotation of the frequency control 39.

Figure 17:
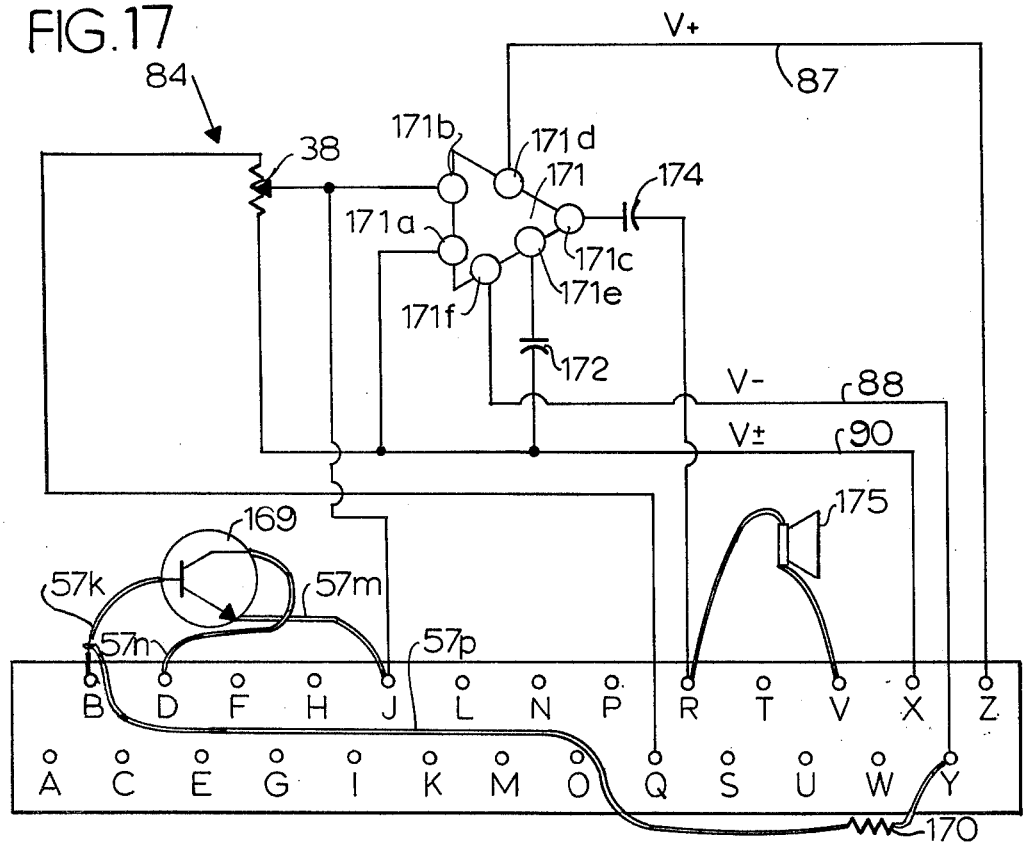
FIG. 17 is a schematic circuit diagram of an illustrative power amplifier circuit of the type useful in the circuit of FIG. 8, shown in conjunction with the program panel.

Another application of the device 30, particularly illustrative of multiple circuit combinations made possible by the program panel 35, provides aural signals corresponding to e.g. the electrocardiogram pulses amplified by the bioelectric preamplifier 82. In this experiment the output of the preamplifier 82, at receptacle 55B is used to control an electronic switch 169 at the program panel across the output of the tone generator 83 at receptacle 55D which is conncted to the input of the audio amplifier 84 at receptacle 55J. In this experiment the programming of the program panel is illustrated in FIG. 17. Therein it can be seen that the electronic switch 169 comprises an NPN transistor having its base connected by a wire 57k to the bio-electric preamplifier output receptacle 55B, its emitter connected by a wire 57m to a direct input to the power amplifier at receptacle 55J, and its collector connected by a wire 57n to the output of the tone generator 83 at receptacle 55D. In operation the transistor 169 switches tone from the tone generator 83 to the power amplifier 84 in accordance with pulses received from the bio-electric preamplifier 82. Tone is heard at the loudspeaker 175 during each ECG waveform complex sensed and amplified by the bio-electric preamplifier 82. To keep the loudspeaker 175 completely silent except during the R component of the ECG waveform (See FIG. 7), a small negative bias may be applied to the base of the transistor 169 through a very high value resistor 170 connected at one end to the minus voltage bus at receptacle 55Y and having the other end connected by a wire 57p to the wire 57k.

Power Amplifier 84 (FIG. 17)

The power amplifier circuit element 84 is illustrated schematically in FIG. 17 as a straight forward circuit employing an integrated circuit 171. The integrated circuit illustrated diagrammatically in FIG. 17 is preferably a monolithic audio power amplifier and may be a type LM 380 made by National Semiconductor Corp., or equivalent. The integrated circuit 171 is a completely self-contained audioamplifier element and as such is capable of a low distortion output at a level up to about 1 watt (root mean square). A wide variety of such devices is available. One of the inputs 171a to the amplifier 171 is connected directly to the common point (V+) bus 90. The other input 171b is connected to the receptacle 55J and the wiper connection of the audio gain control 38. The low side of the potentiometer 38 is connected to the common point bus (V+) 90. The high side of the resistor 38 is connected directly to the receptacle 55Q. A bypass connection 171c of the amplifier 171 is shunted to the common point bus 90 via a bypass capacitor 172. The output 171c of the amplifier element 171 is connected to the receptacle 55R through a high value blocking capacitor 174. V+ is supplied from the receptacle 55Z to the V+ input 171d to the amplifier 171 and the return 171f is connected to the minus voltage bus (V−) 88.

Figure 20:
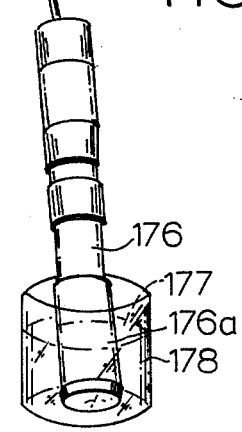
FIG. 20 is a perspective view of a pH probe with a sensor portion immersed in a beaker of liquid, the probe being used with the pH preamplifier circuit of FIG. 19.

In addition to powering headphones or a speaker as discussed in connection with the tone generator 83, the power amplifier 84 is suitable to drive other sound transducers and wave generators and visual displays such as incandescent lamps or light diodes.

pH Meter (FIGS. 19 and 20)

As shown functionally in FIG. 4D, the programmable device 30 is also capable of measuring the degree of acidity or akalinity of a liquid in terms of potential of hydrogen (abbreviated pH). To accomplish pH measurements a sensitive pH probe 176, shown in FIG. 20, is suspended in a beaker 177 containing a liquid 178 having an unknown pH. The probe 176 may be suspended from its connecting cable 179 which may be clamped in a standard chemical clamp 180 extending from a base not shown. The free end of the cord 179 is terminated in a suitable plug 181 adapted to mate with the input jack 146 for the pH sensor on the jack panel 33 of the instrument 30. The probe 176 includes an active element known as a glass electrode 176a. This electrode 176a holds hydrogen ions at a known concentration. When this electrode 176a is immersed in the liquid 178 having an unknown, different hydrogen ion concentration, ions tend to flow from one liquid to the other, thereby setting up a potential difference which is measured as a voltage by the device 30 programmed as a pH meter, shown functionally in FIG. 4D. A preferred probe 176 is an analytical pH probe unit made by Analytical Measurements Company of Chatham, N.J.

Within the instrument 30, the pH meter includes a high impedance direct-coupled amplifier circuit 85, illustrated schematically in FIG. 19. The probe 176 functions to convert relative pH into a potential of up to 600 millivolts applied at the input of a very high impedance operational amplifier 182 configured as a unity gain impedance transformer. The operation amplifier 182 may be type LM 302, manufactured by National Semiconductor Corportion. A bypass capacitor 183 is connected across the input 182a of the operational amplifier 182 to the common point bus 90 to bypass ambient alternating current pickup that might otherwise degrade the null-point. The output 182b of the amplifier 182 is provided to an inverting input 184a of a second operational amplifier 184 through a series-connected impedance-matching resistor 185. The operational amplifier 184 may be type ua 741 manufactured by Fairchild Semiconductor Corporation or the equivalenrt. The non-inverting input 184b of the integrated circuit 184 is applied to a voltage divider network comprising a resistor 186 which is connected to the common point bus (V+) 90, a fixed resistor 187 and the variable resistor pH calibrate control 43, the wiper of which is connected to the V+ voltage bus 87. The voltage divider network of resistors 186, 187 and 43 serves to set the DC reference point of the operational amplifier 184 for calibration purposes. The gain of the amplifier 184 is established by a resistor-capacitor network from the output 184c thereof to the inverting input 184a. The network includes a fixed capacitor 189 across which two series connected resistors are paralleled, a fixed resistor 190 and the variable resistor pH range adjustment control 45. Adjustment of the variable resistor 45 controls the amount of negative feedback and thereby sets the gain level of the integrated circuit 184 to control the range of calibration thereof. The output 184c of the integrated circuit 184 is provided at receptacle 55F of the program panel 35.

In operation the pH preamplifier is connected to the null-point circuit 81, which is programmed to function as a volt meter. A program wire 57i interconnects the receptacles 55F and 55H. A program wire 57j is connected between receptacles 55F and 55K, also to set the correct voltage range of the null-point circuit 81. In use, the voltage level provided at the output of the integrated circuit 184, is read by determining the null-point through rotation of the range control 37. With the pH preamplifier circuit correctly calibrated to the probe and the device 30 programmed as shown in FIG. 19, the pH may be read directly from the dial, e.g. 72 would be pH 7.2.

Power Supply 86 (FIG. 21)

The power supply circuit 86 is shown schematically in FIG. 21. A power transformer 197 includes a primary circuit 197a for line voltage which is provided through the line cord 62 at the power jack 36. A fuse 198 is included in the primary circuit 197a of the transformer 197. The grounding pin of socket 36 is connected to the common point bus 90 and the common point bus 90 is grounded to the chassis of the instrument 30. The transformer 197 includes two secondaries 197b and 197c which are connected in series with the common node connected to the common point bus 90. The secondaries are then supplied to the full-wave rectifier circuit consisting of diodes 199, 200, 201 and 202. The common node of diodes 199 and 202 provides the V+ voltage DC bus 87 and the common node between diodes 200 and 201 provides the V− voltage DC buses 88. A high value bypass capacitor 203 filters the V+ bus 87 and a similar high value filter capacitor 204 filters the V− bus 88.

The regulated 5 to 7 volt DC supply at receptacle 55R and 55S is provided with a three-terminal integrated circuit regulator 205 which may be type LM 309 manufactured by National Semiconductor Corporation or equivalent. The adjustment of voltage of the regulator 205 is provided with a series resistance network consisting of a fixed resistor 206 in series with the variable voltage control potentiometer 42. The series network of resistors 206 and 42 is connected from the output of the regulator 205 to the common point bus (V+) 90. The wiper of the potentiometer 42 is also connected to the common point bus 90. To actuate the regulator circuit, a program wire 57a interconnects receptacles 55T and 55U of the program panel 35, in the manner shown in connection with the discussion of FIG. 2, and also as shown in FIG. 20.

As is apparent from FIG. 21, the power supply provides V+ volts to the receptacle 55Z and V− volts to receptacle 55Y. The regulated voltage is provided at receptacle 55r and 55s, providing receptacles 55t and 55u are interconnected. Thus it will be understood in connection with all of the figures hereof that the power supply provides internal power to the internal circuits of the instrumentation device 30 and provides a source of three different voltage levels at the program panel. These voltages may be utilized as power input for devices such as the colorimeter or oximeter, or they may be used independently for experiments such as electrolysis, electroplating and a host of other laboratory activities.

Versatility of the Device in the Learning Process

It will now be appreciated that the programmable device 30 of the present invention is suitable for use by students over a very wide range of levels in technical curricula, from introductory and survey courses in life sciences and physical sciences, through advanced physics, chemistry, mathematics, electronics and physiology. All student users of the device are taught the basics of what the device 30 is and some of the tasks it will accomplish when programmed and used correctly. No attempt is made initially to explain the theory of how the device 30 accomplishes instrumentation functions. Thus, at the outset, students are provided with the information set forth herein in connection with FIGS. 1 through 7 and the discussion thereof in this specification.

As student users increase their proficiency in programming and using the device 30 to accomplish an increasing variety of instrumentation tasks, the students ae progressively taught how the device functions electrically. For some students, and as appropriate in come courses of study, the circuit explanation would be limited to the information set forth in the detailed functional block diagram of FIG. 8 and the textual discussion thereof herein. For some of the students in more advanced courses, the details of the circuitry and theory of each individual circuit element will form a part of the course of instruction. In those courses, the student will be taught how to read and interpret electronic schematic diagrams such as FIGS. 9, 16, 17, 18, 19 and 21 and how the electronic components illustrated therein are combined by fixed wiring and programming to provide the wide variety of instrumentation functions which the students have by then previously utilized. With this advanced understanding the students are assigned new tasks in measuring phenomena and then encouraged to find suitable novel programming configurations and sensor connections for the device 30 to measure the phenomena.

The foregoing Detailed Description of a Preferred Embodiment is illustrative of a progressive, skeletalized lesson plan of instruction in the application, programming, operation and theory of the device 30 constructed in accordance with the present invention. In a learning situation utilizing the device 30 as a teaching aid, the student would be exposed to the material set forth herein as appropriate to the course of study, the level of the student and his need, ability and desire to learn.

To those skilled in the art to which this invention relates, many changes in construction and widely differing embodiments and applications of the invention will suggest themselves without departing from the spirit and scope of the invention. The disclosure and description herein are purely illustrative and are intended to be in no way limiting. More particularly, it will be appreciated that a virtually unlimited number of combinations will be provided by the program panel 35 in conjunction with the circuit elements of the instrument 30 as well as the peripheral equipment discussed herein and other peripheral equipment.

We claim:

1. A programmable educational instrumentation device for aiding students in learning problem solving and measurement and instrumentation techniques as applied to a wide variety of physical and biological phenomena, said instrument including in combination:

at leat one sensor means for sensing a selected phenomena and generating therefrom an analogous electrical signal, said sensor means having connector means, an instrument housing providing a program panel and a control panel and containing a plurality of electronic circuits, said program panel having a series of spaced-apart connection means, each circuit being connected within said housing to at least one of said connection means, said connection means being adapted to receive an external conductive lead, whereby said device may be programmed into an instrument for measuring a phenomenon by interconnection of selected pairs of connection means, said control panel having a plurality of control means each for controlling a said circuit, input connector means on said housing for connecting a said sensor with a said circuit, one of said circuits being a null-point circuit including reference signal generation means for generating at least one known adjustable reference signal, signal comparison means connected to said reference signal generation means and connected to said sensor means via said input connector means for enabling comparison of said signals and for producing an output signal as the difference thereof, visual display means on said control panel, viewable by a student while operating said device, said display means being connected to said signal comparison means for displaying said output signal, and for indicating a null-point reached when by adjustment of one of said control means said reference signal equals said sensed signal, others of said circuits including amplifier means selectably connectable between said sensor means and said null-point circuit in accordance with connections made at said program panel for amplifying sensed signals at a low level, power-supply means in said housing for providing operating voltages to said circuits and to external devices via connections at designated connection means of said program panel.

2. The device of claim 1 wherein said connection means comprise a series of space apart uniformly sized plug in receptacles with each receptacle adapted to receive a conductive end of a wire and further comprising plural insulated program wires of predetermined length wherein the insulation is removed from the ends thereof to provide said conductive ends.

3. The device of claim 1 further comprising as a part of said null-point circuit range selection means for selecting one of a plurality of predetermined number of operating ranges of said null-point circuit.

4. The device of claim 3 wherein said range selection means are operably connected to said connection means at said program panel whereby the range of said null-point circuit may be determined by interconnection of selected pairs of said connection means.

5. The device of claim 1 wherein said sensor mean comprise at least two probe wires each connected to a said null point circuit at said program panel so that direct current flow through said probe wires may be quantitatively measured by said null-point circuit.

6. The device of claim 5 wherein one of said probe wires includes in series therewith a resistor of predetermined value so that difference in potential across said probe wires may be quantitatively measured by said null-point circuit.

7. The device of claim 6 wherein said resistor is provided at least one end thereof with a clip means enabling temporary electrical interconnection of said resistor and said probe wire.

8. The device of claim 1 wherein said sensor means comprise at least two probe wires one of which is connected to said null-point circuit at said program panel and the other said wire being connected to a said operating voltage at said program panel so that a resistance to which said probe wires are connected may be quantitatively measured by said null-point circuit.

9. The device of claim 1 wherein said amplifier means includes a high gain preamplifier and wherein said sensor means includes in connection with the input of said preamplifier a body contacting electrode.

10. The device of claim 9 wherein said preamplifier comprises a plural input differential preamplifier and plural body contacting electrodes and a said body contacting electrode is connected to each input thereof and to said housing, and wherein the output of said preamplifier is connected to the input of said null-point circuit at said program panel whereby bioelectrical signals sensed at said body contacting electrodes are presented as visual indication on said visual display means.

11. The device of claim 9 wherein said amplifier means additionally comprises an audio amplifier having an input connected to the output of said preamplifier at said program panel and further comprising an audio output transducer connected to an output of said audio amplifier at said program panel whereby bioelectrical signals sensed at said body contacting electrode are presented as amplified sounds at said transducer.

12. The device of claim 1 additionally comprising an audio tone generator and an output audio transducer, and wherein said amplifier means includes an audio amplifier having an input and an output connected to said tone generator and said transducer respectively at said program panel.

13. The device of claim 12 wherein said tone generator includes frequency adjusting means for determining the frequency thereof.

14. The device of claim 13 wherein said audio amplifier includes level control means for adjusting output audio levels over a wide range and wherein said output transducer comprises headphones so that an audiometer is thereby provided.

15. The device of claim 12 wherein said amplifier means also includes a high gain preamplifier and wherein sad sensor means includes in connection with the input of said preamplifier a body contacting electrode and further comprising electronic switch means connected between said preamplifier, said tone generator and said audio amplifier at said program panel whereby tones from said tone generator are switched to said audio amplifier and heard as sounds at said transducer in accordance with bioelectric signals received at said body contacting electrode.

16. The device of claim 1 wherein said amplifier means includes an audio amplifier and wherein said sensor mean includes a microphone connected to an input of said audio amplifier and further comprising an audio output transducer connected to an output of said audio amplifier, whereby a sound amplification instrument is thus provided.

17. The device of claim 1 wherein said sensor means comprises a temperature sensor whereby temperature may be measured by said null-point circuit.

18. The device of claim 1 wherein said sensor means comprises a light sensor whereby light levels may be measured by said null-point circuit.

19. The device of claim 1 wherein said sensor means comprises a light source and a light sensor closely spaced apart therefrom and connected to the input of the null-point circuit, and housing means for holding said light source and said light sensor apart and further comprising a material of unknown light transmittance placed between said light source and said light sensor and means for excluding all ambient light at said light sensor other than that received from said light source, whereby the light transmittance through said material may be measured with said null-point circuit.

20. The device of claim 1 wherein said sensor means includes a probe for measuring potential of hydrogen in a liquid and said amplifier means includes a preamplifier having an input connected to said pH probe and an output connected to said null-point circuit at said program panel whereby the pH of said liquid may be measured with said null-point circuit.

* * * * *

UNITED STATES PATENT AND TRADEMARK OFFICE
CERTIFICATE OF CORRECTION

PATENT NO. : 4,021,933
DATED : May 10, 1977
INVENTOR(S) : Leonard Hughes

It is certified that error appears in the above-identified patent and that said Letters Patent are hereby corrected as shown below:

Column 4, line 54, "circuoit" should read --circuit--.
Column 4, line 57, "circuit" should read --schematically--.
Column 5, line 68, "panel 34" should read --panel 35--.
Column 6, line 35, "herein" should read --hereinafter--.
Column 6, line 40, "electricl" should read --electrical--.
Column 6, line 48, "functions" should read --functional--.
Column 7, line 8, "serve an" should read --serve as--.
Column 8, line 58, after "supply" insert --86--.
Column 9, line 3, "contrl" should read --control--.
Column 9, line 59, "havng" should read --having--.
Column 9, line 64, Column 12, lines 26 and 40, Column 15, lines 8 and 11, Column 16, lines 5 and 66, "V+" should read -- $V^{\pm}$ --.
Column 12, line 17, "resistor 124" should read --resistor 134--.
Column 13, line 8, "tht" should read --that--.
Column 13, line 44, "41a and" should read --41a, 41b and--.
Column 14, line 5, "output of 151c" should read --output 151c--.
Column 14, line 37, "169 at" should read --169 interposed at--.
Column 15, line 36, after "extending" insert --upwardly--.
Column 16, line 2, "equivalenrt" should read --equivalent--.
Column 16, line 26, "55F" should read --55G--.
Column 17, line 39, "ae" should read --are--.
Column 18, line 19, which is line 6 of claim 1, "at leat" should read --at least--.
Column 19, line 23, which is line 2 of claim 7, "at least" should read --at at least--.

UNITED STATES PATENT OFFICE
CERTIFICATE OF CORRECTION

Patent No. 4,021,933  Dated May 10, 1977

Inventor(s) Leonard Hughes

It is certified that error appears in the above-identified patent and that said Letters Patent are hereby corrected as shown below:

Column 20, line 15, which is line 3 of claim 15, "sad sensor" should read -- said sensor --.

Signed and Sealed this twenty-third Day of August 1977

[SEAL]

Attest:

RUTH C. MASON
Attesting Officer

C. MARSHALL DANN
Commissioner of Patents and Trademarks